July 31, 1923.
P. DAIMLER
1,463,256
COMPRESSOR ARRANGEMENT FOR THE MOTORS OF AUTOMOBILE VEHICLES
Filed Sept. 10, 1921
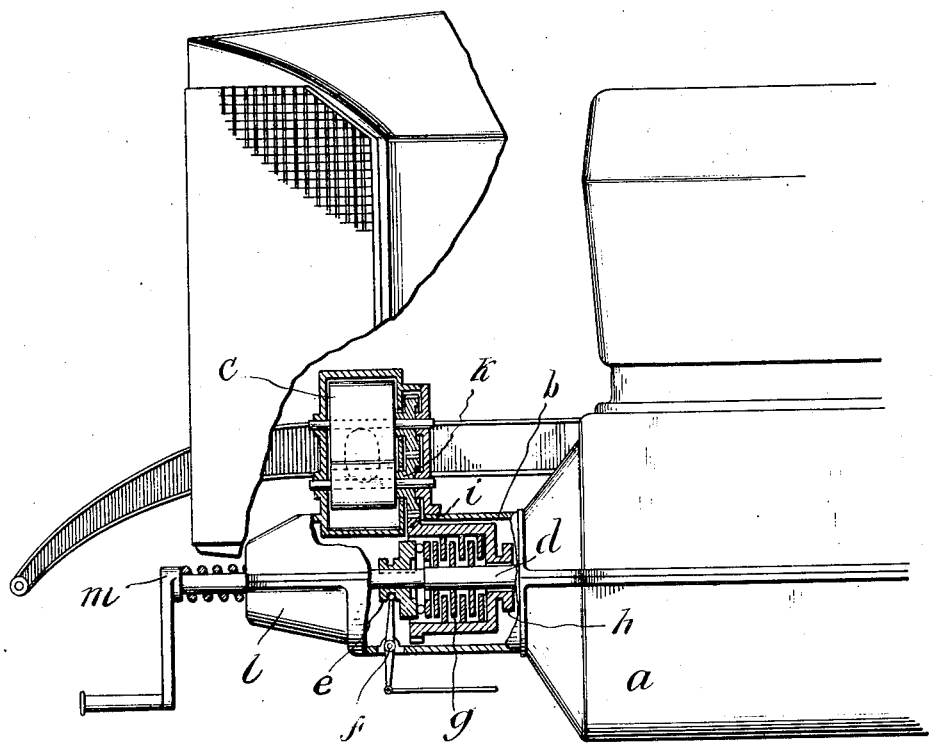
Inventor.
PAUL DAIMLER Patented July 31, 1923.

1,463,256

UNITED STATES PATENT OFFICE.

PAUL DAIMLER, OF CANSTATT, GERMANY, ASSIGNOR TO THE FIRM DAIMLER-MOTOREN-GESELLSCHAFT, OF UNTERTURKHEIM, GERMANY.

COMPRESSOR ARRANGEMENT FOR THE MOTORS OF AUTOMOBILE VEHICLES.

Application filed September 10, 1921. Serial No. 499,849.

*To all whom it may concern:*

Be it known that I, PAUL DAIMLER, a subject of the State of Wurttemberg, residing at 87 Waiblingerstrasse, Cannstatt, Wurttemberg, Germany, have invented certain new and useful Improvements in a Compressor Arrangement for the Motors of Automobile Vehicles, for which I have filed an application in Germany on December 13, 1919, and of which the following is a specification.

This invention relates to the arrangement of a compressor in connection with a motor for automobile-vehicles. This compressor is arranged, according to the invention, on the starting side of the motor parallel or approximately parallel to the motor shaft, in order to simplify its driving gear and to better utilize the space available. The connection of the compressor with the motor casing is suitably effected by a connecting member, which is attached to the motor casing in axial alignment with the crank shaft and which contains the coupling device for coupling or uncoupling the driving gear of the compressor.

In the accompanying drawing is shown a partial side elevation of a motor vehicle showing in section an embodiment of my invention attached to the vehicle.

The compressor $c$ is attached to the motor casing $a$ by means of a connecting casing $b$, which has cylindrical shape and is arranged in axial alignment with the crank shaft $d$. Within the connecting casing $c$ a disk clutch or other coupling device is arranged on the extension of the crank shaft $d$, said clutch serving to transmit the power for driving the compressor $c$. The part $e$ of this clutch or coupling, which part is the connecting or disconnecting coupling member, is axially slidable, but not rotatable on the crank shaft $d$ and its longitudinal movement is effected by means of a double-armed lever $f$, engaging said part $e$ and adapted to be operated from a suitable point. The second part $h$ of the coupling device, which part, at the pressing of the clutch disks $g$ against each other, effects the transmission of motion, is rotatably arranged on the crank shaft. Said part $h$ is provided at its front end with a spur gear wheel, which by means of a gear wheel $k$ drives the pumping elements of the compressor $c$. In the embodiment of the invention illustrated the bracket $l$ of the starting crank supports at the same time also the compressor $c$. It will be seen that according to my invention the compressor or pump is located in the space between the radiator and the engine casing.

Having thus particularly described the nature of this invention what is claimed as new and desired to secure by Letters Patent of the United States is:

In a motor vehicle having a motor, a radiator spaced therefrom and a crank shaft projecting into the space between said motor and radiator, a casing rigidly secured to the motor casing and projecting into the space between the motor and radiator and surrounding said crank shaft, a disengageable clutch mounted upon said crank shaft within said casing, means to actuate said clutch mounted upon and projecting through said casing, a pump rigidly secured to said casing and contained within the space between said motor and radiator, and gearing connecting said pump and clutch entirely enclosed within said casings.

In testimony whereof I affix my signature in presence of two witnesses.

PAUL DAIMLER.

Witnesses:
WALTER SCUNARDSFYN,
JORDAN DUNER.